No. 668,831. Patented Feb. 26, 1901.
W. C. DOCHARTY & R. WAGNER.
TOOL FOR EXTRACTING BUSHINGS OF DRILL CHUCKS.
(Application filed Nov. 13, 1899.)
(No Model.)
Fig. 7.
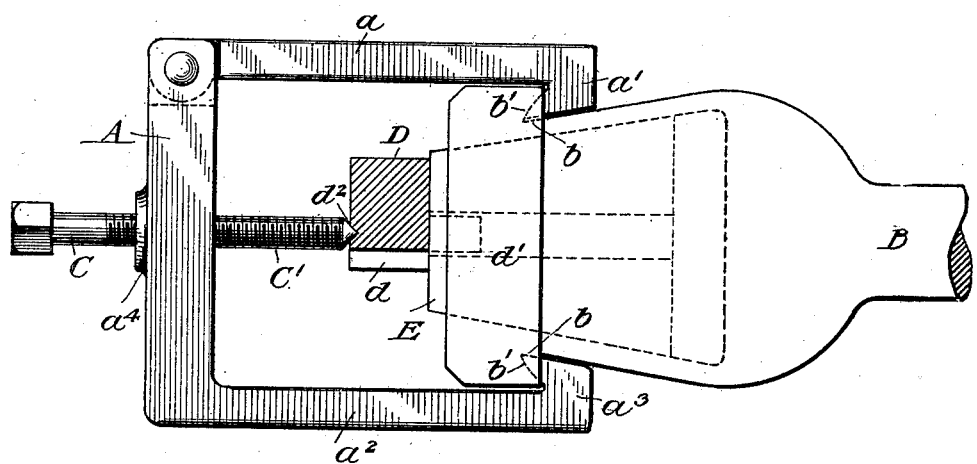
Fig. 1.     Fig. 3.     Fig. 6.
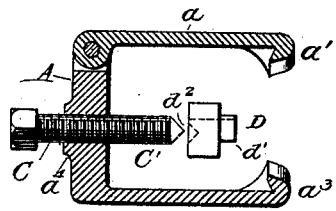 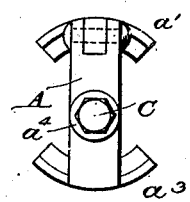 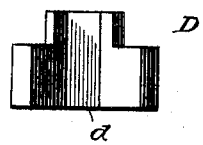
Fig. 2.     Fig. 4.     Fig. 5.
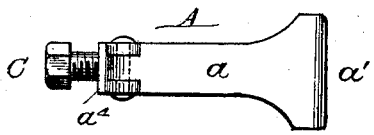  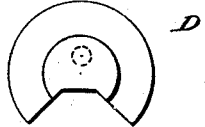
Witnesses:
Inventors.
THE NORRIS PETERS CO., PHOTO-LITHO., WASHINGTON, D. C.

UNITED STATES PATENT OFFICE.

WILLIAM CLARK DOCHARTY AND REINHARD WAGNER, OF NEAR GERMISTON, SOUTH AFRICAN REPUBLIC, ASSIGNORS TO CHAPIN & MANION, LIMITED, OF JOHANNESBURG, SOUTH AFRICAN REPUBLIC.

TOOL FOR EXTRACTING BUSHINGS OF DRILL-CHUCKS.

SPECIFICATION forming part of Letters Patent No. 668,831, dated February 26, 1901.

Application filed November 13, 1899. Serial No. 736,818. (No model.)

*To all whom it may concern:*

Be it known that we, WILLIAM CLARK DOCHARTY, a subject of the Queen of the United Kingdom of Great Britain and Ireland, and REINHARD WAGNER, a subject of the German Emperor, both residing on the property of the Simmer and Jack Proprietary Mines, Limited, near Germiston, in the South African Republic, have invented new and useful Improvements in Tools for Extracting the Bushings of Drill-Chucks, (for which we have applied for Letters Patent in the South African Republic, No. 1,863, dated April 19, 1899, and in Great Britain, No. 15,667, dated July 31, 1899,) of which the following is a specification.

This invention has reference to certain tools or appliances intended for use in the operation of extracting or detaching the sectional tapered bush or wedge-shaped dogs or gripping-jaws from the body or main portion of the chucks of rock-drilling machines. It is designed more particularly to be employed with that class of chuck wherein the body or main portion is formed with a conical cavity or recess expanding inwardly or with the diameter gradually increasing as it recedes from the exterior and having a sectional tapered bush or wedge-shaped jaws arranged therein which are operated by means of an involute helical or like spring arranged within the conical cavity and bearing against the inner ends of the gripping-jaws to act to force them forward to close on the shank or extremity of the drill when inserted between them. Its object is to produce an efficient appliance of few parts which may be readily used for depressing several sections of the bush or the jaws against the spring to permit of the free jaw or jaws being removed, thereby enabling the parts to be taken asunder for examination, renewal, or repair, as may be necessary in the working of the chuck.

The invention will be particularly described by aid of the accompanying drawings thereof, in which—

Figure 1 is a longitudinal sectional elevation of the tool or appliance. Fig. 2 is a side elevation. Fig. 3 is a front or end elevation. Fig. 4 is a side elevation of the detached cod piece or plate D drawn to an enlarged scale. Fig. 5 is a front elevation of same. Fig. 6 is a plan, and Fig. 7 illustrates the tool or appliance in position on the chuck-body for the removal of the gripping-jaws.

In the drawings, A designates a jack or bridge-piece of arched form adapted to span the mouth of the body of the chuck B, to the diameter of which it is approximately equal in length. The bridge-piece is formed with a hinged arm or member $a$, formed at its outer extremity with a curved projection or ledge $a'$ on the inside, and $a^2$ is a like arm or member provided at the other extremity of the bridge-piece A, of which it forms a part or to which it is rigidly attached, this arm or member $a^2$ at its outer extremity being constructed with a curved projection or ledge $a^3$, similar to the pivoted member $a$. The curved projections or ledges $a'$ $a^3$ of the members $a$ $a^2$ are provided to engage a projection or recess $b$, constructed externally on the chuck-body B. The curved form of the projection illustrated in the drawings is designed more particularly for use when the chuck-body B is formed with an external flange at the mouth, as seen at $b'$, Fig. 7, forming a circumferential projection $b$, in which the curved projections $a'$ $a^3$ fit.

The bridge-piece A is tapped to receive a set-screw or screw-bolt C, constituting a pushing device moving longitudinally toward the chuck-body.

D is a cod-piece or detached circular plate which is cut away at $d$ or formed of a shape to engage three only of the four gripping-jaws E or sections of the tapered bush. It is formed with a boss or projection $d'$ on the back to center and support it when placed in position in the mouth of the chuck B and between the gripping-jaws E, and it is provided with a recess $d^2$ at the front for the extremity of the set-screw or screw-bolt C.

$a^4$ is a boss formed on the bridge-piece A to prevent the possibility of the stripping of the thread when the appliance is in use. The set-screw C is, as shown, located nearer the rigid or fixed arm or member $a^2$, so as to concentrate the force transmitted through it on those jaws E engaged by the cod piece or plate D.

It will be obvious that instead of constructing the cod-piece D to engage three of the jaws E it may be formed of such a shape to engage two only of said jaws; but we prefer to construct it as previously described as being the more practicable arrangement.

In using the tool or appliance the fixed arm or member $a^2$ is fitted over the flange $b'$, formed at the mouth of the chuck-body B, so that the circular projection or ledge $a^3$ engages the shoulder $b^2$, formed thereby. The pivoted arm or member $a$ is then placed so that its projection $a'$ engages the shoulder $b'$ on the opposite side. The cod-piece D is then placed with the boss $d'$ projecting into or between the gripping-jaws E in such a way that it engages three only of the jaws E. The set-screw C is then screwed forward in the bridge-piece A to force the cod-piece D inward, and thereby depresses the three jaws E, thus releasing and permitting the remaining and free jaw to be extracted. The set-screw C is then screwed back and the appliance removed from the mouth of the chuck-body B, thus enabling the other sections of the bush or gripping-jaws E and their operating-spring F to be withdrawn. In assembling the parts or fitting the chuck together the spring F is first placed in position in the cavity G and the three sections E of the tapered bush placed in position. The tool is then brought into position to depress the three jaws E against the spring F to enable the fourth jaw to be inserted. The appliance is then removed and the spring F thereupon acts to force the whole of the jaws forward simultaneously until they bear and bind upon one another inside the body.

What we claim as our invention, and desire to protect by Letters Patent, is—

1. In a tool for use in extracting gripping-jaws from chuck-bodies the combination with an arched member adapted at its ends to engage the chuck-body and span the mouth of the same, of a longitudinally-movable pushing device mounted in the arched member and movable toward the chuck-body in a path parallel to the axis of the same and a cod-piece adapted to be engaged by the pushing device and formed to engage and depress several of the gripping-jaws when the pusher is moved longitudinally toward the chuck-body.

2. A tool or appliance for extracting or detaching the sectional tapered bush or gripping-jaws from the body of a chuck of a rock-drilling machine comprising a jack or bridge-piece to span the mouth of the chuck-body, said bridge-piece being formed with a rigid member provided with a projection or ledge to engage an external projection or recess of the chuck-body and a pivoted member formed with a corresponding projection or ledge to engage the external projection or recess of the chuck-body, the bridge-piece being tapped to receive a set-screw or screw-bolt and a cod-piece constructed to engage three sections of the tapered bush or gripping-jaws thus enabling the remaining jaw to be removed substantially as herein described.

3. In a tool or appliance for extracting the wedge-shaped dogs or gripping-jaws from the body of a rock-drilling-machine chuck the combination of the bridge-piece provided at one extremity with a rigid arm or member said member being formed with a curved projection or catch adapted to engage an external projection or recess of the chuck-body and at the other extremity fitted with a correspondingly-shaped pivoted or hinged arm or member constructed with a curved projection or catch adapted to engage the external projection or recess of the chuck-body said bridge-piece being tapped to receive a set-screw or screw-bolt, a set-screw or screw-bolt fitted therein and a cod-piece cut away or formed of a shape to engage three sections of the tapered bush or gripping-jaws and provided with a boss to enter the jaws to center and support it and with a recess for the extremity of the set-screw or screw-bolt substantially as described and shown.

In witness whereof we have hereunto set our hands, at Johannesburg, in the South African Republic, this 23d day of September, 1899, in the presence of the subscribing witnesses.

WILLIAM CLARK DOCHARTY.
REINHARD WAGNER.

Witnesses:
R. W. CHAPIN,
HERM. PREUSSNER.